(12) United States Patent
Windisch et al.

(10) Patent No.: US 6,310,151 B1
(45) Date of Patent: Oct. 30, 2001

(54) METHOD FOR POLYMERIZING CONJUGATED DIOLEFINS (DIENES) WITH CATALYSTS BASED ON COBALT COMPOUNDS IN THE PRESENCE OF VINYLAROMATIC SOLVENTS

(75) Inventors: Heike Windisch, Leverkusen; Werner Obrecht, Moers; Gisbert Michels, Köln; Norbert Steinhauser, Monheim, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/743,630

(22) PCT Filed: Jul. 7, 1999

(86) PCT No.: PCT/EP99/04748

§ 371 Date: Jan. 12, 2001

§ 102(e) Date: Jan. 12, 2001

(87) PCT Pub. No.: WO00/04064

PCT Pub. Date: Jan. 27, 2000

(30) Foreign Application Priority Data

Jul. 18, 1998 (DE) .............................. 198 32 455

(51) Int. Cl.[7] ................. C08F 4/70; C08F 36/04
(52) U.S. Cl. ............ 526/136; 526/139; 526/140; 526/141; 526/142; 526/169.1; 526/335; 526/340.3; 526/340.4
(58) Field of Search .................... 526/139, 141, 526/169.1, 340.4, 136, 140, 142, 335, 340.3

(56) References Cited

U.S. PATENT DOCUMENTS

| 3,299,178 | 1/1967 | Short et al. | 260/880 |
|---|---|---|---|
| 3,573,246 | 3/1971 | Bennett | 260/29.7 |
| 3,573,249 * | 3/1971 | Henderson et al. | 529/169.1 X |
| 4,311,819 | 1/1982 | Tung et al. | 526/173 |
| 5,096,970 | 3/1992 | Hattori et al. | 525/268 |

FOREIGN PATENT DOCUMENTS 0 816 398   1/1998   (EP) .

OTHER PUBLICATIONS

J. Polymer Sci., Part A, Polymer Chemistry 33, (month unavailable) 1995, pp. 2175–2182.
Kobayashi et al, Copolymerization of Butadiene and Styrene with a Gadolinium Tricarboxylate Catalyst.
J. Polymer Sci.: Part A, Polymer Chemistry, 36, (month unavailable) 1998, pp. 241–247.
Kobayashi et al., Homo–and Copolymerization of Butadiene and Styrene with Neodymium Tricarboxylate Catalysts.
Harwart et al, Plaste und Kautschuk, 24/8 (month unavailable) 1977, pp. 540–544, Beiträge zur Homo–und Kopolymerisation von Styrol und Butadien mit einem komplexkoordinativen Initiatorsystem auf der Basis von Titan und Jod 11.
*Database WPI, Wk 9935, Derwent Publications Ltd., London, GB; AN 278315, XP002117616 & JP 05 194656 (Japan Synthetic Rubber) Aug. 3, 1994.

* cited by examiner

Primary Examiner—Fred Teskin
(74) Attorney, Agent, or Firm—Joseph C. Gil; James R. Franks

(57) ABSTRACT

Conjugated diolefins, optionally in combination with other unsaturated compounds which may be copolymerized with the diolefins, are polymerized by performing the polymerization of the diolefins in the presence of catalysts based on cobalt compounds, organoaluminum compounds and modifiers in the presence of aromatic vinyl compounds at temperatures of −30° C. to +80° C. By means of the process according to the invention, it is possible straightforwardly to produce solutions of polydiolefins, such as polybutadiene, having different 1,2 unit contents in aromatic vinyl compounds, which solutions may then, for example, be further processed to yield ABS or HIPS.

8 Claims, No Drawings

METHOD FOR POLYMERIZING CONJUGATED DIOLEFINS (DIENES) WITH CATALYSTS BASED ON COBALT COMPOUNDS IN THE PRESENCE OF VINYLAROMATIC SOLVENTS

This invention relates to a process for the polymerisation of conjugated diolefins with catalysts based on cobalt compounds in the presence of aromatic vinyl compounds.

It has long been known to polymerise conjugated dienes in the presence of a solvent and such polymerisation has been described, for example, by W. Hoffmann, *Rubber Technology Handbook,* Hanser Publishers (Carl Hanser Verlag), Munich, Vienna, New York, 1989. Polybutadiene, for example, is accordingly now predominantly produced by solution polymerisation using coordination catalysts of the Zielger/Natta type, for example based on titanium, cobalt, nickel and neodymium compounds, or in the presence of alkyllithium compounds. The solvent used in each case is highly dependent upon the type of catalyst used. Benzene or toluene as well as aliphatic or cycloaliphatic hydrocarbons are preferably used.

A disadvantage of currently performed polymerisation processes for the production of polydiolefins, such as for example BR, IR, SBR, is the elaborate working up of the polymer solution to isolate the polymers, for example by steam stripping or direct evaporation. A further disadvantage, especially if the polymerised diolefins are to be further processed as impact modifiers for plastics applications, is that the resultant polymeric diolefins must initially be redissolved in a new solvent, for example styrene, so that they may be further processed to yield, for example, acrylonitrile/butadiene/styrene copolymer (ABS) or high impact polystyrene (HIPS).

U.S. Pat. No. 3 299 178 claims a catalyst system based on $TiCl_4$/iodine/Al(iso-Bu)$_3$ for the polymerisation of butadiene in styrene to form homogeneous polybutadiene. Harwart et al., *Plaste und Kautschuk,* 24/8 (1977) 540, describe the copolymerisation of butadiene and styrene using the same catalyst system and the suitability of the catalyst for the production of polystyrene.

It is known from U.S. Pat. No. 4,311,819 to use anionic initiators for the polymerisation of butadiene in styrene. The disadvantage of the anionic initiators is that they result in the formation of butadiene/styrene copolymers (SBR) which, in relation to the butadiene units, permit only slight control of microstructure. It is only possible to increase the proportion of 1,2 or 1,4-trans units by adding modifiers, which results in an increase in the glass transition temperature of the polymer. Using anionic initiators, it is not possible to produce an SBR having an elevated cis content. This fact is primarily disadvantageous because SBR is formed in this process in which, in comparison with homopolymeric polybutadiene (BR), a rising styrene content results in a further increase in the glass transition temperature. However, if the rubber is to be used for impact modification of for example HIPS or ABS, an elevated glass transition temperature of the rubber has a disadvantageous effect on the low temperature properties of the material.

Kobayashi et al, *J. Polym. Sci., Part A, Polym. Chem.,* 33 (1995) 2175 and 36 (1998) 241 have described a catalyst system consisting of halogenated rare earth acetates, such as $Nd(OCOCCl_3)_3$ or $Gd(OCOCF_3)_3$, with tri(isobutyl) aluminium and diethyl-aluminium chloride, which allows the copolymerisation of butadiene and styrene in the inert solvent hexane. Apart from the presence of inert solvents, the disadvantage of these catalysts is that, at a styrene incorporation of as little as approx. 5 mol. %, the catalyst activity falls to below 10 g of polymer/mmol. of catalyst/h and that the 1,4-cis content of the polymer falls distinctly as the styrene content rises.

U.S. Pat. No. 5,096,970 and EP 304088 describe a process for the production of polybutadiene in styrene using catalysts based on neodymium phosphonates, organic aluminium compounds, such as di(isobutyl)aluminium hydride (DIBAH), and a Lewis acid containing halogen, such as ethylaluminium sesquichloride, in which butadiene is reacted in styrene without further addition of inert solvents to yield a 1,4-cis-polybutadiene.

A disadvantage of this catalyst is that the resultant polymers have a very low content of 1,2 units of below 1%. This is disadvantageous because a higher 1,2 content in the polymer has a favourable effect on the grafting behaviour between rubber and the polymer matrix, for example homo- or copolymers of vinyl aromatic compounds.

The rubber solutions in styrene described in the stated patent publications have been used for the production of HIPS by combining the rubber solutions in styrene with free-radical initiators once the unreacted monomer had been removed.

The object of the present invention was accordingly to provide a process for the polymerisation of conjugated diolefins in vinyl aromatic solvents, by means of which it is possible to obtain polydienes having a content of 1,2 units of above 1%, wherein the content of 1,2 units may be varied in a simple manner and an elevated conversion of the conjugated diolefins used of above 50% may be obtained. Moreover, virtually none of the vinyl aromatic solvent used should be reacted, i.e. conversion should be below 1%.

The present invention accordingly provides a process for the polymerisation of conjugated diolefins, which process is characterised in that polymerisation of the diolefins used is performed in the presence of catalysts consisting of a) cobalt compounds, b) organoaluminium compounds and c) modifiers as well as in the presence of vinyl aromatic compounds at temperatures of −30° C. to +80° C., wherein the molar ratio of components a):b):c) is in the range from 1:10–1000:0.1–100, the quantity of component (a) of the catalyst used is 1 µmol. to 10 mmol., relative to 100 g of the monomers used, and the quantity of aromatic vinyl compounds is 10 g to 2000 g, relative to 100 g of the monomers used.

Components a):b):c) are preferably used in the process according to the invention in the range from 1:10–500:0.5–50.

Conjugated diolefins which may be used in the process according to the invention are, for example 1,3-butadiene, 1,3-isoprene, 2,3-dimethylbutadiene, 2,4-hexadiene, 1,3-pentadiene and/or 2-methyl-1,3-pentadiene.

Cobalt compounds (component (a)) which may in particular be considered are those which are soluble in inert organic solvents and are selected from the groups consisting of I complexes of β-diketones with cobalt, II β-keto acid complexes of cobalt, III cobalt salts of organic acids having 6 to 15 carbon atoms, IV complexes of halogenated cobalt compounds of the formula $CoX_aD_b$, wherein X denotes a halogen atom, a means the numbers 2 or 3, D is an organic compound selected from the group consisting of tertiary amines, alcohols, tertiary phosphines, ketones and N,N-dialkylamides and b means a number from 0 to 6, and V organometal complexes of cobalt with π-bonded anions.

Cobalt compounds (component (a)) soluble in inert organic solvents which may, for example be used are:

(I) β-diketone cobalt complexes with β-diketonates of the formula $R^1$—CO—$CR^2$—CO—$R^3$, wherein $R^1$ to $R^3$ may be identical or different and denote hydrogen or an alkyl group having 1 to 10, preferably 1 to 4 C atoms, for example Co(Me—CO—CH—CO—Me)$_2$ and Co(Me—CO—CH—CO—Me)$_3$;

(II) β-keto acid ester complexes of cobalt with keto acid esters of the formula $R^1$—CO—$CR^2$—CO—O—$R^3$, wherein $R^1$ to $R^3$ may be identical or different and denote hydrogen or an alkyl group having 1 to 10, preferably 1 to 4 C atoms, for example Co(Me—CO—CH—CO—O—Me)$_2$, Co(Me—CO—CH—CO—O—Et)$_2$, Co(Me—CO—CH—CO—O—Me)$_3$ and Co(Me—CO—CH$_2$—CO—O—Et)$_3$;

(III) cobalt salts of organic acids having 6 to 15, preferably 6 to 10 carbon atoms, for example Co(octanoate)$_2$, Co(versatate)$_2$;

(IV) complexes of halogenated cobalt compounds of the above formula CoX$_a$D$_b$, for example CoCl$_2$(pyridine)$_2$, CoBr$_2$(pyridine)$_2$, CoCl$_2$(PPh$_3$)$_2$, CoBr$_2$(PPh$_3$)$_2$, COCl$_2$(vinylimidazole)$_4$, CoCl$_2$(EtOH);

(V) organometal complexes of cobalt with π-bonded anions, for example tris-(π-allyl)cobalt, bis-(π-allyl) cobalt chloride, bis-(π-allyl)cobalt bromide, bis-(π-allyl)cobalt iodide, bisacrylonitrile(π-allyl)cobalt, (1,3-butadiene)-[1-(2-methyl-3-butenyl)-π-allyl]cobalt, bis-(π-1,5-cyclooctadienyl)-(tert.-butylisonitrile)cobalt, (π-cyclooctenyl)-(π1,5-cyclooctadienyl)cobalt, (π-cycloheptadienyl)-(π-1,5-cyclooctadienyl)cobalt, (bicyclo[3.3.0]octadienyl)-(π-1,5-cyclooctadienyl) cobalt.

The above-stated catalysts based on cobalt compounds are known and, for example, described and explained in greater detail in the following citations:

B. A. Dolgoplosk et al., *Polym. Sci., Ser. A,* 36/10 (1994) 1380, L. Porri et al., *Comp. Polym. Sci.* 4/2 (1989) 53, O. K. Scharajew et al., *Vysokomol. Soyed. A* 38: No. 3 (1996) 447, M. Takeuchi et al., *Polym. Int.* 29 (1992), L. Porri et al., *Macromol. Chem., Macromol. Symp.* 48/49 (1991) 239, G. Ricci et al., *Polym. Commun.* 29 (1988) 305, N. D. Golubeva et al., *J. Polym. Sci.: Polym. Symp.* 68 (1980) 33 and S. S. Potapov et al. *Vysokomol. Seyed.* A16: No. 11 (1974) 2515.

Component (b) organoaluminium compounds which may in particular be considered are alumoxanes and/or aluminiumorganyl compounds.

Aluminium/oxygen compounds are used as the alumoxanes, which, as is known to the person skilled in the art, are obtained by bringing organoalumium compounds into contact with condensing components, such as water, and which contain acyclic or cyclic compounds of the formula (—Al(R)O—)$_n$, wherein R may be identical or different and denotes a linear or branched alkyl group having 1 to 10 carbon atoms, which may additionally contain heteroatoms, such as oxygen or halogens. R in particular denotes methyl, ethyl, n-propyl, isopropyl, n-butyl, isobutyl, tert.-butyl, n-octyl or isooctyl, particularly preferably methyl, ethyl or isobutyl. Examples of alumoxanes which may be mentioned are: methylalumoxane, ethylalumoxane and isobutylalumoxane, preferably methylalumoxane and isobutylalumoxane.

The stated alumoxanes are, for example, described and explained in greater detail in *"Alumoxanes" Macromol. Symp.* 97 (1995).

The aluminiumorganyl compounds used are compounds which are formed by the reaction of compounds of the formula AlR$_{3-d}$X$_d$, wherein R may be identical or different and denotes an alkyl group having 1 to 12 carbon atoms, a cycloalkyl group having 5 to 12 carbon atoms or an aryl group having 6 to 12 carbon atoms, X denotes a hydrogen or a halogen, such as chlorine, bromine, and d means a number from 0 to 2 with compounds of the formula HYR'$_e$, wherein

Y denotes an element from groups Vb and VIb of the periodic system of elements, preferably oxygen, sulfur and nitrogen, R' may be identical or different and denotes a hydrogen, an allyl, cycloalkyl or aryl group having 1 to 12 carbon atoms and e is equal to 1 or 2 in accordance with the valency of Y.

Compounds of the formula AlR$_{3-d}$X$_d$ which may in particular be used are: trimethyl-aluminium, triethylaluminium, tri-n-propylaluminium, triiisopropylaluminium, tri-n-butylaluminium, triisobutylaluminium, tripentylaluminium, trihexylaluminium, tricyclohexylaluminium, trioctylaluminium, diethylaluminium hydride, di-n-butylaluminium hydride, diisobutylaluminium hydride, diethylaluminium chloride, ethylaluminium sesquichloride, ethylaluminium dichloride, ethylaluminium dibromide, diethylaluminium bromide, ethylaluminium diiodide, diethylaluminium iodide, diisobutylaluminium chloride, octylaluminium dichloride, dioctylaluminium chloride. The following are preferably used: trimethylaluminium, triethylaluminium, triisobutylaluminium, trioctylaluminium, diisobutylaluminium chloride, octylaluminium dichloride.

Compounds of the formula HYR'$_e$ which may in particular be used are: water, alcohols, such as methanol, ethanol, n-propanol, isopropanol, n-butanol, isobutanol, tert.-butanol, hexanol, octanol and glycol, phenols, such as for example phenol, methylphenol, ethylphenol, butylphenol, octylphenol, dodecylphenol, tert.-butylphenol, bis-2,6-tert.-butylphenol and 4-methyl-bis-2,6-tert.-butylphenol, aliphatic and aromatic amines, such as methylamine, ethylamine, butylamine, phenylamine, dimethylamine, diethylamine, dibutylamine, diphenylamine, pyrrolidine and pyridine.

The aluminiumorganyl compounds are described, for example, in Abel, Stone, Wilkinson, *Comprehensive Organometallic Chemistry,* Pergamon Press Ltd., Oxford, 1995.

Modifiers (component (c)) which may in particular be considered are those compounds known to the person skilled in the art as Lewis bases. Particularly preferred are those Lewis bases which contain as donor atom at least one element from groups Vb and VIb of the periodic system of elements, such as nitrogen, phosphorus, oxygen and sulfur, particularly preferably nitrogen or phosphorus.

Modifiers which may in particular be used are: pyridine, tertiary aliphatic or aromatic amines or tertiary aliphatic or aromatic phosphines, such as for example pyridine, vinylimidazole, triethylphosphine and triphenylphosphine.

It may be pointed out in this connection that the component (a) cobalt compounds, the component (b) organoaluminium compounds and the component (c) modifiers may be used both individually and as a mixture with each other. The most favourable mixing ratio may readily be determined by appropriate preliminary testing.

In the process according to the invention, the catalysts are preferably used in quantities of 10 μmol. to 5 mmol., relative to 100 g of the monomers.

It is, of course, also possible to use the catalysts in any desired mixture with each other.

The process according to the invention is performed in the presence of aromatic vinyl compounds, in particular in the presence of styrene, α-methylstyrene, α-methylstyrene dimer, p-methylstyrene, divinylbenzene and/or other alkylstyrenes having 2 to 6 C atoms in the alkyl residue, such as p-ethylstyrene, p-butylstyrene.

The polymerisation according to the invention is very particularly preferably performed in the presence of styrene, α-methylstyrene, α-methylstyrene dimer and/or p-methylstyrene as solvent.

The solvents may be used individually or as a mixture; the most favourable mixing ratio may again readily be determined by appropriate preliminary testing.

The quantity of aromatic vinyl compounds used is preferably 30 to 1000 g, very particularly preferably 50 to 500 g, relative to 100 g of monomers used.

The process according to the invention is preferably performed at temperatures of 0 to 70° C.

The process according to the invention may be performed without pressure or at elevated pressure (0.1 to 12 bar).

The process according to the invention may be implemented continuously or discontinuously, preferably with continuous operation.

The solvent (aromatic vinyl compound) used in the process according to the invention need not be removed by distillation, but may instead remain in the reaction mixture. In this manner, it is possible, for example when styrene is used as the solvent, subsequently to perform a second polymerisation for the styrene, wherein an elastomeric polydiene in a polystyrene matrix is obtained. Similarly, acrylonitrile may be added to the polydiene solution in styrene before the second polymerisation is performed. In this manner, ABS is obtained. Such products are of particular interest as impact-modified thermoplastics.

It is, of course, also possible to remove a proportion of the solvent used and/or of the unreacted monomers after polymerisation, preferably by distillation optionally under reduced pressure, in order to achieve the desired polymer concentration.

Further components, for example unsaturated organic compounds, such as acrylo-nitrile, methyl methacrylate, maleic anhydride, maleimides, which may be copolymerised with the vinyl aromatic solvent, and/or usual aliphatic or aromatic solvents, such as benzene, toluene, ethylbenzene, dimethylbenzene, hexane, heptane or octane, and/or polar solvents, such as ketones, ethers or esters, which are conventionally used as solvents and/or diluents for the polymerisation of the vinyl aromatics, may furthermore be added to the polymer solution before or during the subsequent polymerisation of the solvent, which may be initiated in a known manner by free-radical or thermal means.

As has already been mentioned above, the process according to the invention is distinguished by particular economic viability and good environmental compatibility, as the solvent used may be polymerised in a subsequent stage, wherein the polymer present in the solvent serves to modify thermoplastics (for example to increase impact strength).

In the process according to the invention, the composition and thus the properties of the resultant polymers may be varied very widely. For example, by varying the catalyst composition, preferably by varying the modifiers, it is possible purposefully to adjust the content of 1,2 units, i.e. of lateral double bonds in the polymer chain, within broad limits without in so doing polymerising or copolymerising the vinyl aromatic solvent.

It is furthermore possible very straightforwardly to influence the molecular weights and the branching of the polymers and thus also the solution viscosity of the polymers, such as for example by varying the catalyst concentration, the diene concentration, the reaction temperature or by adding suitable chain-transfer agents, such as for example hydrogen, 1,2-butadiene or cyclooctadiene.

Another advantage of the process according to the invention is that, in the case of direct polymerisation in styrene, it is also possible to produce and straightforwardly further process low molecular weight polymers of such a low molecular weight that, as solids having elevated cold flow or elevated tackiness, they could be processed and stored only with difficulty.

The advantage of low molecular weight polymers is that, even at an elevated polymer content in vinyl aromatic solvents, the solution viscosity remains as low as desired and the solutions may consequently readily be conveyed and processed.

EXAMPLES

The polymerisation reactions were performed in the absence of air and moisture under argon. The isolation of the polymers from the solution in styrene described in individual Examples was performed solely for the purpose of characterising the polymers obtained. The polymers may, of course, also be stored and appropriately further processed in the solution in styrene without being isolated.

The styrene used as the solvent for the diene polymerisations was stirred under argon for 24 hours over $CaH_2$ at 25° C. and distilled at 25° C. under reduced pressure. In order to demonstrate that polymerisation is also possible with styrene, in some of the Examples, certain quantities of the stabiliser (2,6-di-tert.-butyl)(4-methyl)phenol (=Ionol) were added and the polymerisation of the butadiene performed in the presence of the stabiliser.

The styrene content in the polymer is determined by $^1$H-NMR spectroscopy, polybutadiene selectivity (1,4-cis, 1,4-trans and 1,2 content) is determined by IR spectroscopy.

Examples 1 to 7

In a 0.5 liter flask, which was provided with a crown cork with an integral septum, the stated quantity of liquid butadiene was added to the initially introduced styrene under argon at 25° C. through a cannula and then the stated quantities of the individual catalyst components were added in the sequence methylalumoxane (MAO, 10% solution in toluene) and $CoCl_2(pyridine)_2$ (0.0235 molar solution in $CH_2Cl_2$). The temperature during the polymerisation was established by a water bath; after the reaction time, the polymer was isolated by precipitating the polymer solution in methanol/BKF (BKF=bis[(3-hydroxy)(2,4-di-tert.-butyl)(6-methyl)phenyl]methane) and dried for one day in a vacuum drying cabinet at 60° C. Table 1 shows the batch sizes, reaction conditions and the properties of the polymer.

TABLE 1

Examples 1 to 7

| Example | 1 | 2 | 3 | 4 | 5 | 6 | 7 |
|---|---|---|---|---|---|---|---|
| CoBr$_2$(pyridine)$_2$ in mmol. | 0.05 | 0.05 | 0.05 | 0.05 | 0.1 | 0.1 | 0.1 |
| MAO in mmol. | 5 | 5 | 5 | 5 | 10 | 10 | 10 |
| Polymerisation | | | | | | | |
| Styrene in ml | 75 | 75 | 75 | 75 | 75 | 75 | 75 |
| 1,3-butadiene in g | 18.1 | 20.9 | 29.5 | 20.6 | 23.2 | 18.1 | 18.5 |
| Temperature in °C. | 25 | 40 | 40 | 60 | 25 | 25 | 40 |
| Reaction time in h | 3 | 3 | 21 | 21 | 2 | 21 | 3 |
| Polymer | | | | | | | |
| Yield in g | 2.69 | 6.0 | 17.1 | 8.0 | 8.5 | 10.8 | 7.7 |
| BR with | | | | | | | |
| 1,4-cis in % | 92 | 95 | 92 | 89 | 92 | 93 | 93 |
| 1,4-trans in % | 5 | 3 | 4 | 6 | 5 | 4 | 4 |
| 1,2 in % | 2 | 2 | 4 | 5 | 3 | 3 | 3 |
| PS* in % | 0.08 | 0 | 0.25 | 0.95 | 0.12 | 0.16 | 0 |

PS*: Content of polymerised styrene, relative to introduced quantity in wt. %.

Examples 8 to 13

In a 0.5 liter flask, which was provided with a crown cork with an integral septum, the stated quantity of liquid butadiene was added to the initially introduced styrene under argon at 25° C. through a cannula and then the stated quantities of the individual catalyst components were added in the sequence (2,6-di-tert.-butyl)(4-methyl)phenol (Ionol), methylalumoxane (MAO, 10% solution in toluene) and CoCl$_2$(PPh$_3$)$_2$ (0.0086 molar solution in CH$_2$Cl$_2$). The temperature during the polymerisation was established by a water bath; after the reaction time, the polymer was isolated by precipitating the polymer solution in methanol/BKF and dried for one day in a vacuum drying cabinet at 60° C. Table 2 shows the batch sizes, reaction conditions and the properties of the polymer.

TABLE 2

Examples 8 to 13

| Example | 8 | 9 | 10 | 11 | 12 | 13 |
|---|---|---|---|---|---|---|
| CoCl$_2$(PPH$_3$)$_2$ in mmol. | 0.011 | 0.011 | 0.0057 | 0.011 | 0.011 | 0.011 |
| MAO in mmol. | 1 | 1 | 0.5 | 1 | 1 | 1 |
| Ionol in mmol. | | | | 0.05 | 0.2 | 0.5 |
| Polymerisation | | | | | | |
| Styrene in ml | 40 | 40 | 40 | 40 | 40 | 40 |
| 1,3-butadiene in g | 7.2 | 10.0 | 8.3 | 8.5 | 8.8 | 7.1 |
| Temperature in °C. | 0 | 30 | 25 | 30 | 30 | 30 |
| Reaction time in h | 0.25 | 0.03 | 1 | 0.03 | 0.03 | 1.03 |
| Polymer | | | | | | |
| Yield in g | 6.4 | 6.6 | 5.7 | 6.1 | 7.1 | 5.1 |
| BR with | | | | | | |
| 1,4-cis in % | 12 | 10 | 11 | 19 | 12 | 14 |
| 1,4-trans in % | 2 | 2 | 1 | 2 | 1 | 1 |
| 1,2 in % | 86 | 88 | 88 | 79 | 87 | 85 |
| PS* in % | 0.35 | 0.58 | 0.51 | 0.34 | 0.63 | 0.45 |

PS*: Content of polymerised styrene, relative to introduced quantity in wt. %.

Examples 14 to 19

In a 0.5 liter flask, which was provided with a crown cork with an integral septum, the stated quantity of liquid butadiene was added to the initially introduced styrene under argon at 25° C. through a cannula and then the stated quantities of the individual catalyst components were added in the sequence (2,6-di-tert.-butyl)(4-methyl)phenol (Ionol), methylalumoxane (MAO, 10% solution in toluene) and CoBr$_2$(PPh$_3$)$_2$ (0.0459 molar solution in CH$_2$Cl$_2$). The temperature during the polymerisation was established by a water bath; after the reaction time, the polymer was isolated by precipitating the polymer solution in methanol/BKF and dried for one day in a vacuum drying cabinet at 60° C. Table 3 shows the batch sizes, reaction conditions and the properties of the polymer.

TABLE 3

Examples 14 to 19

| Example | 14 | 15 | 16 | 17 | 18 | 19 |
|---|---|---|---|---|---|---|
| CoBr$_2$(PPh$_3$)$_2$ in mmol. | 0.01 | 0.05 | 0.01 | 0.01 | 0.01 | 0.01 |
| MAO in mmol. | 1 | 5 | 2.5 | 1 | 1 | 1 |
| Ionol in mmol. | | | | 0.05 | 0.2 | 0.5 |
| Polymerisation | | | | | | |
| Styrene in ml | 40 | 75 | 75 | 40 | 40 | 40 |
| 1,3-butadiene in g | 7.1 | 21.1 | 20.8 | 9.6 | 9.1 | 7.8 |
| Temperature in °C. | 24 | 24 | 40 | 24 | 24 | 24 |
| Reaction time in h | 1.75 | 1.25 | 0.9 | 1.75 | 1.75 | 1.75 |
| Polymer | | | | | | |
| Yield in g | 5.1 | 18.6 | 8.5 | 6.1 | 6.5 | 7.1 |
| BR with | | | | | | |
| 1,4-cis in % | 12 | 15 | 16 | 16 | 12 | 9 |
| 1,4-trans in % | 2 | 4 | 2 | 1 | 1 | 1 |
| 1,2 in % | 86 | 81 | 82 | 83 | 87 | 90 |
| PS* in % | 0.28 | 0.74 | 0.40 | 0.17 | 0.18 | 0.39 |

PS*: Content of polymerised styrene, relative to introduced quantity in wt. %.

What is claimed is:

1. A process for the polymerisation of conjugated diolefins comprising polymerizing conjugated diolefins in the presence of,
   catalysts consisting of,
   (a) cobalt compounds,
   (b) organoaluminum compounds, and
   (c) modifiers comprising at least one Lewis base which contains as a donor atom at least one element selected from Groups Vb and VIb of the periodic system of the elements,
   as well as in the presence of vinyl aromatic compounds, wherein the polymerization is performed at temperatures of −30° C. to +80° C.; the molar ratio of components (a):(b):(c) is in the range from 1:10–1000:0.1–100; the quantity of component (a) of the catalyst used is 1 μmol. to 10 mmol., relative to 100 g of the monomers used; and the quantity of vinyl aromatic compounds is 10 g to 2000 g, relative to 100 g of the monomers used.

2. The process of claim 1 wherein the conjugated diolefins are selected from at least one of 1,3-butadiene, 1,3-isoprene, 2,3-dimethylbutadiene, 2,4-hexadiene, 1,3-pentadiene and 2-methyl-1,3-pentadiene.

3. The process of claim 1 wherein the cobalt compounds (a) comprise at least one compound selected from the group of: complexes of β-diketones with cobalt; β-keto acid complexes of cobalt; cobalt salts of organic acids having 6 to 15 carbon atoms; complexes of halogenated cobalt compounds; and organometal complexes of cobalt with π-bonded anions.

4. The process of claim 1 wherein the organoaluminum compounds (b) comprise at least one compound selected from the group of alumoxanes.

5. The process of claim 1 wherein the organoaluminum compounds (b) comprise at least one aluminumorganyl compound which is formed by the reaction of compounds of the formula,

$$AlR_{3-d}X_d$$

wherein
- R may be identical or different and denotes an organic alkyl, cycloalkyl or aryl group having 1 to 12 carbon atoms,
- X denotes a hydrogen or a halogen, and
- d means a number from 0 to 2, with compounds of the formula,

$$HYR'_e$$

wherein
- Y denotes an element form groups Vb and VIb of the periodic system of elements,
- R' may be identical or different and denotes a hydrogen, an alkyl, cycloalkyl or aryl group having 1 to 12 carbon atoms, and
- e is equal to 1 or 2 in accordance with the valency of Y.

6. The process of claim 1 wherein the aromatic vinyl compounds are selected from at least one of styrene, α-methylstyrene, α-methylstyrene dimer, p-methylstyrene, divinylbenzene and alkylstyrenes having 2 to 6 C atoms in the alkyl residue.

7. A process for the polymerisation of conjugated diolefins comprising polymerizing conjugated diolefins in the presence of, catalysts consisting of,
- (a) cobalt compounds,
- (b) organoaluminum compounds comprising at least one compound selected from the group of alumoxanes, and
- (c) modifiers, as well as in the presence of vinyl aromatic compounds, wherein the polymerization is performed at temperatures of −30° C. to +80° C.; the molar ratio of components (a):(b):(c) is in the range from 1:10–1000:0.1–100; the quantity of component (a) of the catalyst used is 1 μmol. to 10 mmol., relative to 100 g of the monomers used; and the quantity of vinyl aromatic compounds is 10 g to 2000 g, relative to 100 g of the monomers used.

8. The process of claim 7 wherein said alumoxane is selected from at least one of methylalumoxane, ethylalumoxane and isobutylalumoxane.

* * * * *